(12) United States Patent
Reichman et al.

(10) Patent No.: US 7,588,676 B2
(45) Date of Patent: Sep. 15, 2009

(54) BASE-FACILITATED PRODUCTION OF HYDROGEN FROM CARBONACEOUS MATTER

(75) Inventors: Benjamin Reichman, West Bloomfield, MI (US); William Mays, Commerce, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 765 days.

(21) Appl. No.: 10/984,202

(22) Filed: Nov. 10, 2004

(65) Prior Publication Data
US 2005/0163705 A1 Jul. 28, 2005

Related U.S. Application Data

(63) Continuation-in-part of application No. 10/763,616, filed on Jan. 23, 2004, now Pat. No. 7,481,992.

(51) Int. Cl.
*C25B 1/02* (2006.01)
*C01B 3/02* (2006.01)

(52) U.S. Cl. .................... 205/637; 423/419.1; 423/421; 423/422; 423/648.1; 423/650

(58) Field of Classification Search ............. 423/648.1, 423/650, 419.1, 421, 422; 205/637
See application file for complete search history.

(56) References Cited

U.S. PATENT DOCUMENTS

| | | | | |
|---|---|---|---|---|
| 3,252,774 | A | * | 5/1966 | McMahon et al. ......... 48/214 R |
| 3,786,138 | A | * | 1/1974 | Shalit et al. ................. 423/650 |
| 4,699,700 | A | * | 10/1987 | Dhooge ....................... 205/560 |
| 5,028,307 | A | * | 7/1991 | Rightmyer ................... 204/278 |
| 6,607,707 | B2 | * | 8/2003 | Reichman et al. ......... 423/648.1 |
| 6,890,419 | B2 | * | 5/2005 | Reichman et al. ........... 205/637 |
| 6,994,839 | B2 | * | 2/2006 | Reichman et al. ......... 423/648.1 |

\* cited by examiner

*Primary Examiner*—Wayne Langel
(74) *Attorney, Agent, or Firm*—David W. Schumaker

(57) ABSTRACT

A base-facilitated process for producing hydrogen. Hydrogen is produced from a reaction of carbonaceous matter with a base and water, preferably through the formation of a bicarbonate or carbonate by-product. The base-facilitated hydrogen-producing reactions are thermodynamically more spontaneous and are able to produce hydrogen gas at less extreme reaction conditions than conventional reformation or gasification reactions of carbonaceous matter. In another embodiment, the instant reactions permit the production of hydrogen from carbonaceous matter without the production of carbon dioxide or carbon monoxide. In a preferred embodiment, the carbonaceous matter is coal or a derivative thereof.

29 Claims, 2 Drawing Sheets

Hydrogen Production Using Carbon And Solid NaOH
At Different Temperatures In 40 mL Container

BASE-FACILITATED PRODUCTION OF HYDROGEN FROM CARBONACEOUS MATTER

CROSS-REFERENCE TO RELATED APPLICATIONS

This application is a continuation-in-part of application Ser. No. 10/763,616, entitled "Base-Facilitated Reformation Reactions of Organic Substances", filed Jan. 23, 2004 now U.S. Pat. No. 7,481,992, and published as U.S. Pat. Appl. Pub. No. US2004/0156777 A1, the disclosure of which is herein incorporated by reference.

FIELD OF INVENTION

This invention relates to processes for producing hydrogen gas. More particularly, this invention relates to the production of hydrogen gas from carbonaceous matter. Most particularly, the instant invention relates to the production of hydrogen gas through reactions of carbonaceous matter under alkaline conditions.

BACKGROUND OF THE INVENTION

Modern societies are critically dependent on energy derived from fossil fuels to maintain their standard of living. As more societies modernize and existing modern societies expand, the consumption of fossil fuels continues to increase and the growing dependence worldwide on the use of fossil fuels is leading to a number of problems. First, fossil fuels are a finite resource and concern is growing that fossil fuels will become fully depleted in the foreseeable future. Scarcity raises the possibility that escalating costs could destabilize economies as well as the likelihood that nations will go to war over the remaining reserves. Second, fossil fuels are highly polluting. The greater combustion of fossil fuels has prompted recognition of global warming and the dangers it poses to the stability of the earth's ecosystem. In addition to greenhouse gases, the combustion of fossil fuels produces soot and other pollutants that are injurious to humans and animals. In order to prevent the increasingly deleterious effects of fossil fuels, new energy sources are needed.

The desired attributes of a new fuel or energy source include low cost, plentiful supply, renewability, safety, and environmental compatibility. Hydrogen is currently a promising prospect for providing these attributes and offers the potential to greatly reduce our dependence on conventional fossil fuels. Hydrogen is the most ubiquitous element in the universe and, if its potential can be realized, offers an inexhaustible fuel source to meet the increasing energy demands of the world. Hydrogen is available from a variety of sources including coal, natural gas, hydrocarbons in general, organic materials, inorganic hydrides and water. These sources are geographically well distributed around the world and accessible to most of the world's population without the need to import. In addition to being plentiful and widely available, hydrogen is also a clean fuel source. Combustion of hydrogen produces water as a by-product. Utilization of hydrogen as a fuel source thus avoids the unwanted generation of the carbon and nitrogen based greenhouse gases that are responsible for global warming as well as the unwanted production of soot and other carbon based pollutants in industrial manufacturing.

The realization of hydrogen as a ubiquitous source of energy ultimately depends on its economic feasibility. Economically viable methods for producing hydrogen as well as efficient means for storing, transferring, and consuming hydrogen, are needed. Chemical and electrochemical methods have been proposed for the production of hydrogen. The most readily available chemical feedstocks for hydrogen are organic compounds, primarily hydrocarbons and oxygenated hydrocarbons. Common methods for obtaining hydrogen from hydrocarbons and oxygenated hydrocarbons are dehydrogenation reactions and oxidation reactions.

Steam reformation and the electrochemical generation of hydrogen from water through electrolysis are two common strategies currently used for producing hydrogen. Both strategies, however, suffer from drawbacks that limit their practical application and/or cost effectiveness. Steam reformation reactions are endothermic at room temperature and generally require temperatures of several hundred degrees to achieve acceptable reaction rates. These temperatures are costly to provide, impose special requirements on the materials used to construct the reactors, and limit the range of applications. Steam reformation reactions also occur in the gas phase, which means that hydrogen must be recovered from a mixture of gases through a separation process that adds cost and complexity to the reformation process. Steam reformation also leads to the production of the undesirable greenhouse gases $CO_2$ and/or $CO$ as by-products. Water electrolysis has not been widely used in practice because high expenditures of electrical energy are required to effect water electrolysis. The water electrolysis reaction requires a high minimum voltage to initiate and an even higher voltage to achieve practical rates of hydrogen production. The high voltage leads to high electrical energy costs for the water electrolysis reaction and has inhibited its widespread use.

In U.S. Pat. No. 6,607,707 (the '707 patent), the disclosure of which is incorporated by reference herein, the instant inventors considered the production of hydrogen from hydrocarbons and oxygenated hydrocarbons through reactions of hydrocarbons and oxygenated hydrocarbons with a base. Using a thermodynamic analysis, the instant inventors determined that reactions of many hydrocarbons and oxygenated hydrocarbons react spontaneously with a base or basic aqueous solution to form hydrogen gas at particular reaction conditions, while the same hydrocarbons and oxygenated hydrocarbons react non-spontaneously in conventional steam reformation processes at the same reaction conditions. Inclusion of a base was thus shown to facilitate the formation of hydrogen from many hydrocarbons and oxygenated hydrocarbons and enabled the production of hydrogen at less extreme conditions than those normally encountered in steam reformation reactions, thereby improving the cost effectiveness of producing hydrogen gas. In many reactions, the processes of the '707 patent led to the formation of hydrogen gas from a liquid phase reaction mixture, in some cases at room temperature, where hydrogen was the only gaseous product and thus was readily recoverable without the need for a gas phase separation step. The reactions of the '707 patent further operate through the formation of carbonate ion or bicarbonate ion and avoid the production of the greenhouse gases $CO$ and $CO_2$. Inclusion of a base creates a new reaction pathway for the formation of hydrogen gas with thermodynamic benefits that allow for the production of hydrogen gas at lower temperatures than are needed for corresponding steam reformation processes.

In co-pending U.S. patent application Ser. No. 10/321,935 (the "935 application), published as U.S. Pat. Appl. Pub. No. 2003/0089620, the disclosure of which is incorporated by reference herein, the instant inventors considered electrochemical methods to promote the production of hydrogen from organic substances in the presence of water (or acidic solution) and/or a base. They showed that electrochemical reactions of organic substances with water to produce hydrogen require lower electrochemical cell voltages than water electrolysis. They also showed that electrochemical reactions of organic substances in the presence of an acid or base require low electrochemical cell voltages at room temperature.

In co-pending U.S. patent application Ser. No. 10/636,093 (the '093 application), published as U.S. Pat. Appl. Pub. No. 2004/0028603, the disclosure of which is incorporated by reference herein, the instant inventors recognized that the realization of the beneficial properties of the reactions described in the '707 patent and the co-pending '935 application requires a system level consideration of the costs and overall efficiency of the reactions. In addition to energy inputs and raw materials, consideration of the disposal or utilization of by-products must be made. Of particular importance is consideration of the dispensation of the carbonate and bicarbonate ion products of the disclosed hydrogen producing reactions. In the co-pending '093 application, the instant inventors describe strategies for the recycling of the carbonate and bicarbonate ions. A carbonate recycle process was described that includes a first step in which carbonate ion is reacted with a metal hydroxide to form a soluble metal hydroxide and a weakly soluble or insoluble carbonate salt. The soluble metal hydroxide may be returned to the hydrogen producing reaction as a base reactant for further production of hydrogen. In a second step, the carbonate salt is thermally decomposed to produce a metal oxide and carbon dioxide. In a third step, the metal oxide is reacted with water to reform the metal hydroxide used in the first step. The carbonate recycle process is thus sustainable with respect to the metal hydroxide and the overall hydrogen producing process is sustainable with respect to the base through the carbonate recycling process of the '093 application. Bicarbonate by-products of hydrogen producing reactions of organic substances with bases can be similarly recycled according to the '093 application by first converting a bicarbonate by-product to a carbonate and then recycling the carbonate.

In co-pending U.S. patent application Ser. No. 10/763,616 (the '616 application), published as U.S. Pat. Appl. Pub. No. 2004/0156777, the disclosure of which is incorporated by reference herein, the instant inventors described an extension of the base-facilitated production of hydrogen from organic substances to a wider range of starting materials. Of particular importance in the "616 was the production of hydrogen from petroleum-related or petroleum-derived starting materials such as long chain hydrocarbons; fuels such as gasoline, kerosene, diesel, petroleum distillates and components thereof; and mixtures of organic substances.

The hydrogen producing reactions of the '707 patent and the '935 and '616 applications provide for an efficient, environmentally friendly method for generating the hydrogen needed for the advancement of a hydrogen based economy. There is a need to further extend the range of applicability of the hydrogen producing reactions beyond what was described in the earlier patents and co-pending applications. Of particular interest is consideration of the range of starting materials that may be used in the reactions and the suitability of commonly available organic substances for use as reactants. Also of interest is the range of viable reaction conditions that are conducive to the formation of hydrogen gas and optimization of reaction conditions with respect to trade-offs that may be present between reaction efficiency, reaction rate and process cost.

SUMMARY OF THE INVENTION

The instant invention provides a process for producing hydrogen gas from chemical or electrochemical reactions of carbonaceous matter thereof with bases in which carbonate and/or bicarbonate ion is produced as a by-product. The instant process optionally includes a carbonate ion recycle process in which the carbonate ion by-product is transformed to a base that can subsequently be further reacted with an organic substance, mixture thereof or carbonaceous matter to produce hydrogen gas.

The instant base-facilitated reformation reactions improve the thermodynamic spontaneity of producing hydrogen gas from carbonaceous matter relative to the production of hydrogen gas through the conventional reformation of the carbonaceous matter. In one embodiment, the greater thermodynamic spontaneity permits the production of hydrogen gas through the instant base-facilitated reactions of carbonaceous matter at temperatures that are lower than those needed to produce hydrogen gas from the carbonaceous matter in a conventional reformation reaction. In another embodiment, the greater thermodynamic spontaneity permits the production of hydrogen gas from carbonaceous matter at a faster rate at a particular temperature in a base-facilitated reaction than in a conventional reformation reaction of the carbonaceous matter at the particular temperature.

In a preferred embodiment, hydrogen is produced from reactions of coal with a base and water in a chemical or electrochemical reaction. Coal is carbonaceous matter that contains carbon, hydrogen, oxygen and other elements in varying proportions. The instant base-facilitated reactions permit the production of hydrogen from coal at lower temperatures or faster rates relative to conventional steam reforming or gasification reactions of coal. The reactions of the instant invention further permit the production of hydrogen from coal without the co-production of greenhouse gases such as carbon dioxide and carbon monoxide.

DETAILED DESCRIPTION OF THE ILLUSTRATED EMBODIMENTS

Figure 1:
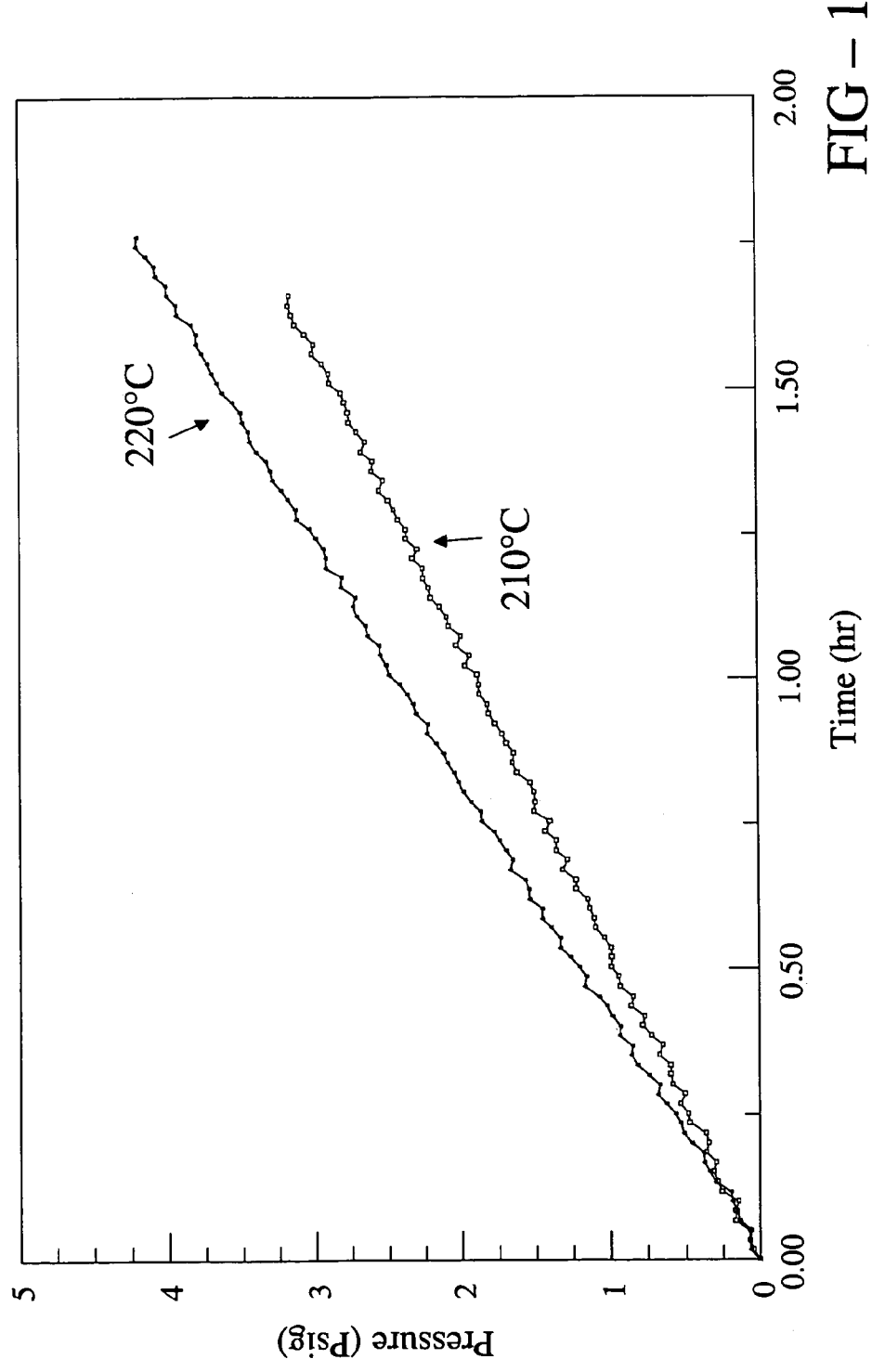
FIG. 1. Variation of hydrogen gas pressure as a function of reaction time in a base-facilitated reaction of carbon at 210° C. and 220° C.

The instant invention is concerned with an extension of the chemical and electrochemical hydrogen producing reactions described in U.S. Pat. No. 6,607,707 (the '707 patent), U.S. patent application Ser. No. 10/321,935 (the '935 application), and U.S. patent application Ser. No. 10/763,616 (the '616 application), the disclosures of which are incorporated by reference herein. The instant invention in particular provides for the production of hydrogen from carbonaceous matter. In a preferred embodiment, hydrogen is produced from coal in a base-facilitated reformation reaction that proceeds through a carbonate ion or a bicarbonate ion by-product. In another preferred embodiment, hydrogen is produced from coal in a reaction that does not produce greenhouse gases as a by-product.

The hydrogen producing reactions of the instant invention include the reaction of carbonaceous matter with a base. As used herein, carbonaceous matter refers generally to naturally occurring carbon-containing materials and substances. In a preferred embodiment, the carbonaceous matter is coal. Coal is a natural solid that is normally brown to black in color. Coal is the product of physical and chemical alterations of vegetation. Original accumulations of vegetation (e.g. woody plants) in a swamp or moist environment led to the formation of peat. Peat is converted to coal upon burial through the action of geologic processes that involve increases in pressure and temperature that act to compress and harden the material and to alter the chemical composition. The geologic processes responsible for the formation of coal lead to an increase in the carbon content and a decrease in the oxygen and hydrogen content of the material relative to the plant matter from which the coal formation process is initiated. Coal can thus be viewed as being rich in carbon relative to plant matter, biomass and other renewable organics. Coal typically includes carbon along with various organic and inorganic compounds or elements.

Various coals may be used as starting materials in the instant hydrogen-producing reactions, including anthracitic, bituminous, sub-bituminous, and lignitic coals. The primary constituents of coal are carbon (C), hydrogen (H), nitrogen (N), oxygen (O) and sulfur (S). The different ranks of coal differ in the relative proportions of these constituents and these differences lead to differences in the heating value of coal. Generally speaking, the higher the rank is, the greater is the carbon content and the greater is the heating value of coal. The carbon content of different ranks of coal, on average, typically decreases in the following order:

Anthracite>Bituminous>Sub-Bituminous>Lignite

A compositional analysis of representative samples of different ranks of coal is provided in Table 1 hereinbelow. The compositions are selected examples taken from a database maintained by the United States Geological Survey and are based on an ultimate analysis. The table includes the amount, in weight percent, of the primary elemental constituents of natural coal samples as well as the weight percent ratio of carbon to hydrogen (C/H). The samples included in Table 1 are representative examples of coals suitable for use in the instant invention.

The plant and natural organic matter from which coal is derived (e.g. biomass) is comprised of organic compounds. Carbohydrates are primary components of biomass. The most abundant components of biomass are monosaccharides such as glucose, which has a chemical formula $C_6H_{12}O_6$. In terms of elemental weight percent, glucose is made up of 40.00% carbon, 6.67% hydrogen and 53.33% oxygen. As can be seen from Table 1, the vast majority of coals have a higher proportion of carbon, a lower proportion of hydrogen and a lower proportion of oxygen than biomass. The differences in the proportions of the elements reflect the natural evolution of the composition of coal.

In the instant invention hydrogen is produced from a reaction of the carbon contained in coal and the amount of hydrogen formed varies with the carbon content of the coal. The instant invention may further permit the liberation of hydrogen contained in coal as hydrogen gas. In one embodiment, hydrogen is formed from coal having a weight percent of carbon between of 45% and 95%. In one embodiment, hydrogen is formed from coal having a weight percent of carbon between 50% and 90%. In another embodiment, hydrogen is formed from coal having a weight percent of carbon between 55% and 85%. In still another embodiment, hydrogen is formed from coal having a weight percent of carbon between 60% and 75%. In other embodiments, the coal or carbonaceous matter includes amorphous carbon. Other carbonaceous materials within the scope of the instant invention include peat, coke, and coal tar as well as other derivatives and by-products of coal.

TABLE 1

Ultimate Analysis of Selected Samples of Coal (Wt. %)

| Sample | Rank | Location | H | C | N | O | S | C/H |
|---|---|---|---|---|---|---|---|---|
| D205172 | Lignite | AR | 7.00 | 31.10 | 0.60 | 46.10 | 0.70 | 4.44 |
| D173470 | Lignite | CO | 6.70 | 36.40 | 0.60 | 42.30 | 0.30 | 5.43 |
| D189152 | Sub-bituminous | MT | 6.20 | 37.10 | 0.80 | 45.90 | 0.70 | 5.98 |
| W236221 | Lignite | TX | 5.52 | 44.03 | 0.79 | 29.18 | 1.24 | 7.97 |
| W233983 | Bituminous | AL | 4.84 | 44.12 | 0.86 | 31.76 | 0.42 | 9.12 |
| D178913 | Sub-bituminous | WA | 5.70 | 48.10 | 0.80 | 30.50 | 0.40 | 8.43 |
| W202688 | Bituminous | OH | 4.70 | 54.90 | 1.10 | 23.30 | 0.70 | 11.68 |
| D182628 | Bituminous | MO | 5.30 | 57.40 | 0.80 | 14.70 | 6.10 | 10.83 |
| W189011 | Bituminous | MD | 3.70 | 62.50 | 1.40 | 4.60 | 2.10 | 16.89 |
| W218960 | Bituminous | GA | 3.86 | 65.54 | 1.23 | 4.55 | 0.87 | 16.98 |
| D172594 | Bituminous | MI | 5.80 | 70.00 | 1.40 | 19.00 | 1.20 | 12.07 |
| W206444 | Bituminous | PA | 5.50 | 76.70 | 1.40 | 9.00 | 1.00 | 13.94 |
| W184939 | Anthracite | PA | 2.50 | 85.60 | 0.80 | 3.70 | 0.60 | 34.24 |

(Locations:
AR = Arkansas,
CO = Colorado,
MT = Montana,
TX = Texas,
AL = Alabama,
WA = Washington,
OH = Ohio,
MO = Missouri,
MD = Maryland,
GA = Georgia,
MI = Michigan,
PA = Pennsylvania)

In further embodiments of the instant invention, the carbonaceous matter is characterized by a high ratio of the weight percent of carbon to the weight percent of hydrogen. The ratio of the weight percent of carbon to the weight percent of hydrogen may be referred to herein as the carbon/hydrogen weight percent ratio. In one embodiment, the carbon/hydrogen weight percent ratio is greater than 6. In another embodiment, the carbon/hydrogen weight percent ratio is greater than 8. In still another embodiment, the carbon/hydrogen weight percent ratio is greater than 10. In still another embodiment, the carbon/hydrogen weight percent ratio is greater than 12. In another embodiment, the carbon/hydrogen weight percent ratio is greater than 16.

In the instant invention, carbonaceous matter is utilized as a feedstock or starting material in a base-facilitated hydrogen-producing reaction. As discussed in the '707 patent, the '935 application and '616 application, reactions of organic substances with a base permit the production of hydrogen gas through the formation of carbonate ion and/or bicarbonate ion by-products. Inclusion of a base as a reactant in the production of hydrogen from organic substances thus provides an alternative reaction pathway relative to conventional reformation reactions of organic substances, which proceed through a reaction pathway that leads to the production of $CO_2$ from a reaction of an organic substance with water.

In the instant invention, base-facilitated reactions of carbonaceous matter are demonstrated. The instant base-facilitated reactions lead to the production of hydrogen from carbonaceous matter. More particularly, the instant reactions permit formation of hydrogen from a reaction of the carbon contained in carbonaceous matter. The instant reactions provide an alternative reaction pathway of carbonaceous matter that leads to a more spontaneous (or less non-spontaneous) reaction at a particular set of reaction conditions relative to a conventional reformation reaction of the carbonaceous matter. The instant invention may further permit the liberation of hydrogen contained in carbonaceous matter as hydrogen gas.

Currently, reformation of coal occurs through a set of reactions that begins with reaction (1) below, where carbon is the principle reacting component of coal and competing side reactions are neglected for the purposes of this discussion.

$$C_{(s)} + H_2O_{(g)} \leftrightarrows CO_{(g)} + H_{2(g)} \quad (1)$$

In this reaction, $C_{(s)}$ designates the carbon contained in coal. The product mixture of carbon monoxide (CO) and $H_2$ gases is known as syngas and can be further reacted to produce other hydrogenated organic fuels such as methanol or ethanol. Alternatively, the carbon monoxide of syngas can be reacted via the water-gas shift reaction (2) to produce additional hydrogen:

$$CO_{(g)} + H_2O_{(g)} \leftrightarrows CO_{2(g)} + H_{2(g)} \quad (2)$$

By combining reactions (1) and (2), a net coal reaction can be written as shown in reaction (3) below:

$$C_{(s)} + 2H_2O_{(g)} \leftrightarrows CO_{2(g)} + 2H_{2(g)} \quad (3)$$

A thermodynamic analysis can be used to predict the facility of the coal reaction (3). Specifically of interest are the Gibbs free energy and enthalpy change of reaction. The Gibbs free energy is an indicator of the thermodynamic spontaneity of a chemical reaction. Spontaneous reactions have negative values for the Gibbs free energy, while non-spontaneous reactions have positive values for the Gibbs free energy. A spontaneous reaction is a reaction that proceeds without the additional input of energy at a particular set of reaction conditions. Reaction conditions such as reaction temperature, reaction pressure, concentration etc. may influence the value of the Gibbs free energy. A reaction that is non-spontaneous at one set of conditions may become spontaneous at another set of conditions. The magnitude of the Gibbs free energy is an indicator of the degree of spontaneity of a reaction. The more negative (or less positive) the Gibbs free energy is, the more spontaneous is the reaction.

The enthalpy change of a reaction indicates whether a reaction is endothermic or exothermic. Endothermic reactions are reactions that require an input of heat to perform, while exothermic reactions require no input of heat to initiate and instead release energy. The costs or process modifications associated with providing heat to endothermic reactions are generally undesirable, so there is a general preference for exothermic reactions.

A thermodynamic analysis of reaction (1) above indicates that $\Delta G^0_{rxn} = 21.9$ kcal/mol and $\Delta H^0_{rxn} = 31.5$ kcal/mol, where $\Delta G^0_{rxn}$ and $\Delta H^0_{rxn}$ are the Gibbs energy and enthalpy of reaction at standard conditions (25° C., 1 atm. and unit activity of reactants and products), respectively. The thermodynamic parameters indicate that reaction (1) is both non-spontaneous and endothermic at standard conditions and therefore that reaction (1) must be at more extreme reaction conditions. In practice, the results indicate that reaction (1) requires elevated reaction temperatures in order to become spontaneous and to proceed at a practically useful rate.

A corresponding analysis of reaction (3) shows that $\Delta G^0_{rxn} = 15.1$ kcal/mol and $\Delta H^0_{rxn} = 21.7$ kcal/mol. As is the case for reaction (1), reaction (3) is both non-spontaneous and endothermic at standard conditions and thus requires elevated reaction temperatures to produce hydrogen at practical rates.

In the instant invention, hydrogen is produced from coal in a base-facilitated reaction that avoids the need to proceed via the formation of CO or $CO_2$. Instead, hydrogen is produced from the carbon in coal via a carbonate and/or bicarbonate by-product compound as shown in the base-facilitated reactions (4) and (5):

$$C_{(s)} + 2NaOH_{(s)} + H_2O_{(g)} \leftrightarrows 2H_{2(g)} + Na_2CO_{3(s)} \quad (4)$$

$$C_{(s)} + NaOH_{(s)} + 2H_2O_{(g)} \leftrightarrows 2H_{2(g)} + NaHCO_{3(s)} \quad (5)$$

In these reactions, sodium hydroxide (NaOH) is a base, sodium carbonate ($Na_2CO_3$) is a carbonate compound by-product and sodium bicarbonate ($NaHCO_3$) is a bicarbonate compound by-product. In a given reaction of coal with a base, either or both of a carbonate or bicarbonate by-product may be formed with the relative proportion of the carbonate and bicarbonate by-products being determined by the ratio of base to the carbon in the coal.

The thermodynamic parameters of reaction (4) are $\Delta G^0_{rxn} = -13.7$ kcal/mol and $\Delta H^0_{rxn} = -9.1$ kcal/mol and the thermodynamic parameters of reaction (5) are $\Delta G^0_{rxn} = -3.5$ kcal/mol and $\Delta H^0_{rxn} = -10.0$ kcal/mol. Both base-facilitated reactions are spontaneous and exothermic at standard conditions. In practice, both reactions are expected to produce hydrogen at appreciable rates at much less extreme conditions than the coal reaction (3).

The base-facilitated reactions (4) and (5) demonstrate the beneficial effect of a base on the thermodynamic spontaneity of the production of hydrogen from coal. The thermodynamic spontaneity of reactions (4) and (5) at standard conditions indicates that hydrogen can be produced spontaneously at standard conditions from coal through the instant base-facilitated reactions, whereas the spontaneous production of hydrogen from coal via the reaction (3) is not possible at standard conditions.

The rate of production of hydrogen gas is another important consideration of interest to the instant inventors. It is generally preferred to produce hydrogen gas at the fastest rate possible. In addition to influencing the spontaneity of a reaction, it is generally the case that once a reaction is spontaneous, an increase in temperature increases the rate of a reaction. In the instant base-facilitated hydrogen-producing reactions (4) and (5), the rate of hydrogen production increases as the temperature is increased above the standard state temperature.

The greater spontaneity of hydrogen production afforded by the instant base-facilitated hydrogen-producing reactions indicates that at a particular reaction temperature, the rate of production of hydrogen is higher for a base-facilitated reaction according to the instant invention than for reaction (3). At temperatures at which base-facilitated reaction (4) or (5) of coal is spontaneous and reaction (3) is non-spontaneous, the rate of production of hydrogen is greater for the base-facilitated reaction than for the reaction. Above a certain temperature, reaction (3) and the instant base-facilitated reactions (4) or (5) of coal are all spontaneous. Even at temperatures at which reaction (3) and the base-facilitated reactions are all spontaneous, it remains the case that the instant base-facilitated reactions are more spontaneous than reaction (3). At a common temperature at which reaction (3) and the instant base-facilitated reactions of coal are all spontaneous, the rate of production of hydrogen is greater for the base-facilitated reactions than for reaction (3). The beneficial effects of including a base in the instant reaction thus include a greater rate of production of hydrogen relative to reaction (3) at a particular reaction temperature due to the greater spontaneity of the instant base-facilitated reactions.

The advantages of the instant base-facilitated reactions are also manifested over a wide range of conditions of temperature, pressure, species concentration etc. The greater spontaneity of the instant base-facilitated hydrogen production reactions leads to faster rates of production of hydrogen at common reaction conditions for the instant reactions relative to reaction (3), even at temperatures or other conditions for which reaction (3) is also spontaneous. Also, if a particular rate of formation of hydrogen is required, that rate can be achieved at less extreme (e.g. at lower temperature) through the instant base-facilitated reactions than through reaction (3).

The thermodynamic spontaneity analysis indicates generally that production of hydrogen from coal becomes increasingly more spontaneous as the amount of base in the reaction increases. Reaction (3) has no base present and is less spontaneous than base-facilitated reaction (5) having a low concentration of base present which is less spontaneous than base-facilitated reaction (4) having a high concentration of base present. As a result, the instant base-facilitated reformation reactions become spontaneous at less extreme reaction conditions (e.g. lower reaction temperatures) than reaction (3) and further produce hydrogen at faster rates at common conditions. The instant base-facilitated reactions also permit the production of hydrogen while avoiding the simultaneous production of the greenhouse gases CO and $CO_2$.

EXAMPLE 1

In this example, the production of hydrogen from carbon is described. 0.3 g of carbon black and 2.0 g of solid sodium hydroxide were intimately mixed and placed into a stainless steel cylinder reactor having a volume of ~40 mL. The sodium hydroxide included about 5% by weight of water. The carbon black and sodium hydroxide occupied about 25% of the volume of the reactor. Electrical coils were wrapped around the reactor for heating and the temperature was controlled with a thermocouple attached to the bottom of the reactor. The reactor was sealed and then flushed with helium to remove oxygen from the reactor. In the flushing process, the cylinder was first evacuated with a vacuum pump and then charged with flowing helium until the pressure reached about atmospheric pressure. The process was performed three times.

At the end of the third charge with helium, the helium was left in the reactor and the pressure at room temperature was measured to be about 17 psi. The reactor was wrapped with insulation, raised to the desired reaction temperature and connected to a data acquisition system that recorded the pressure change in the reactor as a function of time. Data were taken at several different temperatures. At each temperature, hydrogen was generated by the instant reaction and the experiment was halted when sufficient time had elapsed to create a pressure of ~50 psi in the reactor. Upon reaching this pressure, the process was stopped and the reactor was allowed to cool down to room temperature. When the reactor returned to room temperature, a sample of the gas was taken and analyzed with a gas chromatograph to confirm the presence of hydrogen gas.

The results obtained at 210° C. and 220° C. are shown in FIG. 1 herein. The graph shows the change in the pressure of the reactor due to the production of hydrogen gas from carbon as a function of time up to ~1.75 hr. At both temperatures, hydrogen is produced at nearly linear rate. The data at 220° C. indicate a faster rate of production of hydrogen than the data at 210° C., an observation of the general tendency for the rate of a chemical reaction to increase with increasing temperature.

This example demonstrates the production of hydrogen from a reaction of carbon with sodium hydroxide and water.

EXAMPLE 2

In this example, the production of hydrogen from coal is described. The coal sample used in this experiment was received from Basic Services, a coal company with a location in Virginia. The sample was excavated out of a part of the raven coal bed located in St. Paul, Va. (Wise County). A chemical analysis of the specific sample used in this experiment was not obtained, but the USGS database mentioned hereinabove provides the following information for three samples extracted from the raven coal bed located in St. Paul, Va.:

TABLE 2

Ultimate Analysis of Selected Samples of Coal extracted from the Raven Coal Bed (Wt. %)

| Sample | Rank | Location | H | C | N | O | S | C/H |
|--------|------|----------|------|-------|------|------|------|-------|
| W203384 | Bituminous | Virginia | 5.10 | 73.70 | 1.40 | 8.00 | 0.90 | 14.45 |
| W215446 | Bituminous | Virginia | 4.84 | 72.05 | 1.52 | 6.50 | 1.10 | 14.89 |
| W193664 | Bituminous | Virginia | 4.70 | 70.90 | 1.40 | 6.80 | 1.20 | 15.09 |

1.0 g of the coal sample and 7.0 g of solid sodium hydroxide were intimately mixed and placed into a stainless steel cylinder reactor having a volume of ~40 mL. The sodium hydroxide included about 5% by weight of water. The coal and sodium hydroxide occupied about 25% of the volume of the reactor. Electrical coils were wrapped around the reactor for heating and the temperature was controlled with a thermocouple attached to the bottom of the reactor. The reactor was sealed and then flushed with helium to remove oxygen from the reactor. In the flushing process, the cylinder was first evacuated with a vacuum pump and then charged with flowing helium until the pressure reached about atmospheric pressure. The process was performed three times.

At the end of the third charge with helium, the helium was left in the reactor and the pressure at room temperature was measured to be about 17 psi. The reactor was wrapped with insulation, raised to the desired reaction temperature and connected to a data acquisition system that recorded the pressure change in the reactor as a function of time. Data were taken at several different temperatures. At each temperature, hydrogen was generated by the instant reaction and the experiment was halted when sufficient time had elapsed to create a pressure of ~50 psi in the reactor. Upon reaching this pressure, the process was stopped and the reactor was allowed to cool down to room temperature. When the reactor returned to room temperature, a sample of the gas was taken and analyzed with a gas chromatograph to confirm the presence of hydrogen gas.

Figure 2:
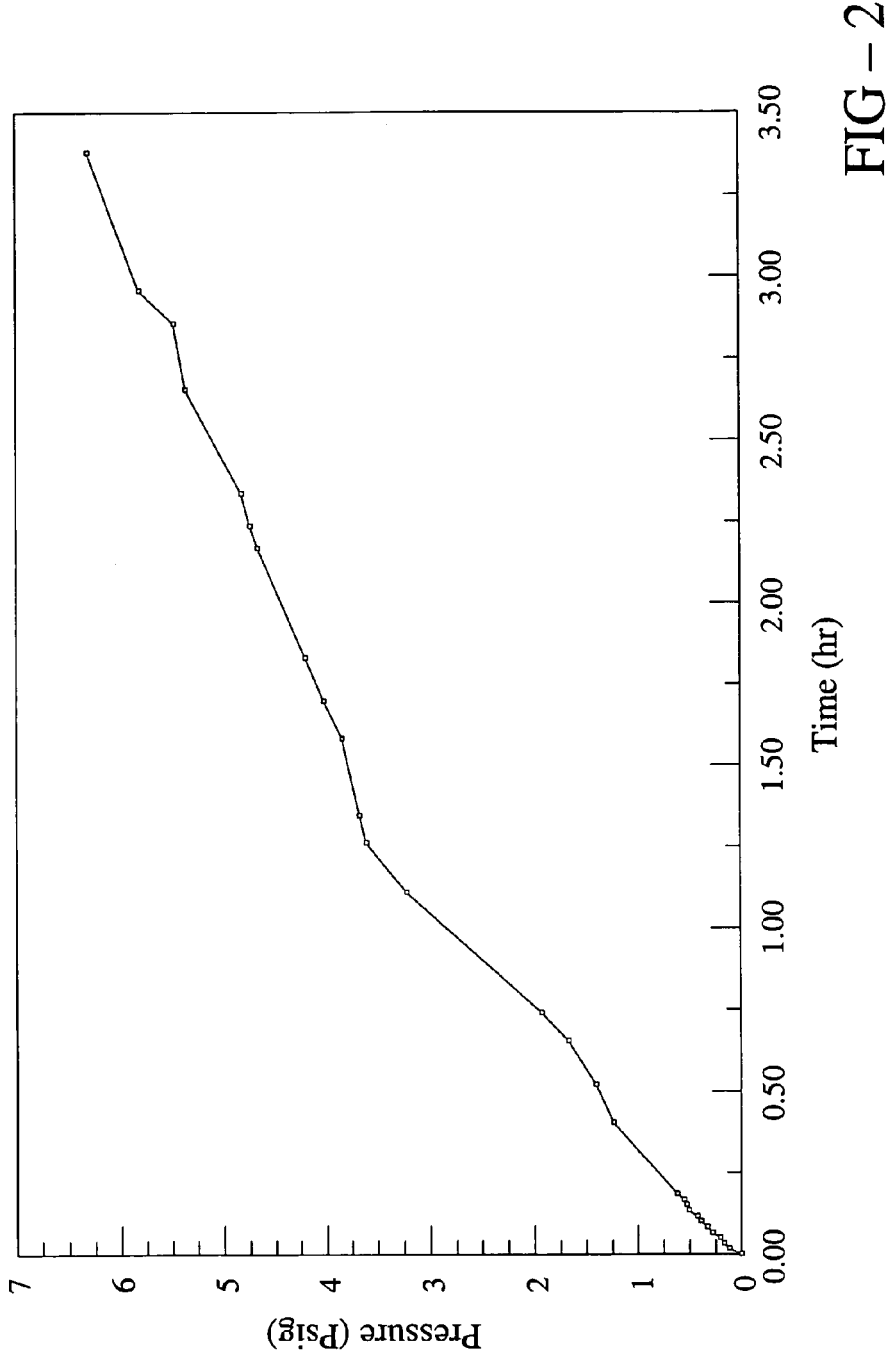
FIG. 2. Variation of hydrogen gas pressure as a function of reaction time in a base-facilitated reaction of coal at 280° C.

The results obtained at 280° C. are shown in FIG. 2 herein. The graph shows the change in the pressure of the reactor due to the production of hydrogen gas from coal as a function of time up to ~3.4 hr. The data indicate that hydrogen is produced steadily over time.

This example demonstrates the production of hydrogen from a reaction of coal with sodium hydroxide and water and generally shows the production of hydrogen from carbon contained within carbonaceous matter.

In the foregoing examples, water was present as an adsorbate in the sodium hydroxide. The instant invention further contemplates use of an aqueous base or reaction of carbonaceous matter with a solid phase base in the presence of liquid water or water vapor.

Metal hydroxides are the preferred bases in the instant reactions. Representative metal hydroxides include alkali metal hydroxides (e.g. NaOH, KOH etc.) alkaline earth metal hydroxides (e.g. $Ca(OH)_2$, $Mg(OH)_2$, etc.), transition metal hydroxides, post-transition metal hydroxides and rare earth hydroxides. Non-metal hydroxides such as ammonium hydroxide may also be used. At standard state conditions, most hydroxide compounds are solids and the solid phase is one preferred form of introducing metal hydroxide bases in the instant reactions. When using a solid phase base, the base can be intimately mixed with a carbonaceous material through, for example, grinding. Alternatively, the base can be applied as a surface layer onto a carbonaceous material. Aqueous solutions are another preferred solution form of hydroxide compounds. Still other preferred forms of providing a base as a reactant in the instant reactions include suspensions of solid phase bases and molten phase bases, where molten phase bases may be formed upon heating a solid phase base to a reaction temperature desired for a particular hydrogen-producing reaction according to the instant invention.

In a further embodiment of the instant invention, the instant base-facilitated reactions are conducted electrochemically to produce hydrogen from carbonaceous matter. As described in the parent '935 application, inclusion of a base in a reformation reaction reduces the electrochemical potential (voltage) required to effect the production of hydrogen from an organic substance relative to the production of hydrogen from the corresponding conventional electrochemical reformation reaction. The instant invention further includes electrochemical reactions in accordance with the parent '935 application as applied to the production of hydrogen from carbonaceous matter. In these embodiments, carbonaceous matter is placed in an electrochemical cell having an anode and a cathode and a voltage is applied between the anode and cathode to effect the electrolytic production of hydrogen from the carbonaceous matter in an electrochemical reaction in accordance with the '935 application. In a preferred embodiment, an aqueous or other electrolyte is included along with the carbonaceous matter and base in the electrochemical cell.

In yet another embodiment of the instant invention, the instant base-facilitated reactions are conducted in combination with the carbonate or bicarbonate recovery reactions discussed in the co-pending parent '093 application. The carbonate or bicarbonate recovery reactions are intended to improve the overall efficiency of the production of hydrogen from carbonaceous matter. As indicated hereinabove, in the embodiments of the instant base-facilitated reaction, carbonate or bicarbonate compounds are produced as a by-product of the reaction. A carbonate or bicarbonate compound is a side product that needs to be sold as a commodity, utilized, discarded or otherwise dispensed with. In order to improve the efficiency of hydrogen production, it is desirable to recycle or otherwise utilize the carbonate or bicarbonate compound by-product.

The '093 application discusses recovery reactions that may be used to recycle carbonate or bicarbonate by-products. Various reactions are discussed depending on the form of the carbonate or bicarbonate by-product formed in the instant base-facilitated reaction. As an example, if a carbonate by-product is formed as a metal carbonate precipitate, this precipitate can be collected and thermally decomposed to obtain a metal oxide. This metal oxide can subsequently be reacted with water to form a metal hydroxide that can be returned as a base reactant to the instant base-facilitated reaction. As another example, if a carbonate by-product is formed as a metal carbonate that is soluble in the reaction mixture, further reaction with a metal hydroxide may occur where the metal hydroxide is selected so that the carbonate salt of its metal has a low solubility (low $K_{sp}$) so that a metathesis reaction occurs to precipitate out a metal carbonate while leaving behind a soluble metal hydroxide that can be used as a base reactant in further runs of the instant base-facilitated reactions. Bicarbonate by-products may be similarly re-utilized. The method of producing hydrogen gas through the instant base-facilitated reformation reactions may thus optionally include additional steps directed at the recycling, conversion or re-utilization of carbonate or bicarbonate by-products in accordance with the '093 application.

The foregoing discussion and description are not meant to be limitations upon the practice of the present invention, but rather illustrative thereof. It is to be appreciated by persons of skill in the art that numerous equivalents of the illustrative embodiments disclosed herein exist. It is the following claims, including all equivalents and obvious variations thereof, in combination with the foregoing disclosure which define the scope of the invention.

We claim:

1. A process for producing hydrogen gas comprising the step of reacting carbonaceous matter with a base to form said hydrogen gas, said carbonaceous matter comprising carbon, wherein the weight percent of carbon in said carbonaceous matter is between 45% and 95%;

wherein said reaction step includes an electrochemical reaction, said electrochemical reaction occurring in an electrochemical cell into which said carbonaceous matter, said base and an electrolyte are placed to form an electrochemical reaction system, said electrochemical cell including an anode and cathode in contact with said electrochemical system, said electrochemical reaction being initiated upon applying a voltage between said anode and said cathode.

2. The process of claim 1, wherein the weight percent of carbon in said carbonaceous matter is between 50% and 90%.

3. The process of claim 1, wherein the weight percent of carbon in said carbonaceous matter is between 55% and 85% by weight.

4. The process of claim 1, wherein the weight percent of carbon in said carbonaceous matter is between 60% and 75%.

5. The process of claim 1, wherein said carbonaceous matter further comprises hydrogen.

6. The process of claim 5, wherein the carbon/hydrogen weight percent ratio is greater than 6.

7. The process of claim 5, wherein the carbon/hydrogen weight percent ratio is greater than 8.

8. The process of claim 5, wherein the carbon/hydrogen weight percent ratio is greater than 10.

9. The process of claim 5, wherein the carbon/hydrogen weight percent ratio is greater than 12.

10. The process of claim 5, wherein the carbon/hydrogen weight percent ratio is greater than 16.

11. The process of claim 5, wherein said carbonaceous matter further comprises oxygen.

12. The process of claim 11, wherein said carbonaceous matter further comprises nitrogen.

13. The process of claim 1, wherein said carbonaceous matter is coal.

14. The process of claim 13, wherein the rank of said coal is lignite.

15. The process of claim 13, wherein the rank of said coal is sub-bituminous.

16. The process of claim 13, wherein the rank of said coal is bituminous.

17. The process of claim 13, wherein the rank of said coal is anthracite.

18. The process of claim 1, wherein said carbonaceous matter is coke, coal tar or peat.

19. The process of claim 1, wherein said carbonaceous mater comprises amorphous carbon.

20. The process of claim 1, wherein said carbonaceous matter undergoes said hydrogen-producing reaction in the solid phase.

21. The process of claim 1, wherein said carbonaceous mailer and said base undergo said hydrogen-producing reaction in the presence of liquid water or water vapor.

22. The process of claim 1, wherein said hydrogen-producing reaction does not form carbon dioxide or carbon monoxide.

23. The process of claim 1, wherein said base comprises a hydroxide compound.

24. The process of claim 23, wherein said hydroxide compound is a metal hydroxide compound.

25. The process of claim 24, wherein said metal hydroxide compound is an alkali metal hydroxide compound.

26. The process of claim 1, wherein said hydrogen-producing reaction further forms a carbonate or bicarbonate compound.

27. The process of claim 26, further including the step of reacting said carbonate or bicarbonate compound with a metal hydroxide compound.

28. The process of claim 27, further including the step of thermally decomposing said carbonate or bicarbonate precipitate, said thermal decomposition step producing a metal oxide.

29. The process of claim 1, wherein said base is a metal hydroxide.

* * * * *